(12) United States Patent
Shing et al.

(10) Patent No.: US 6,217,778 B1
(45) Date of Patent: Apr. 17, 2001

(54) ANIONIC AND NONIONIC DISPERSION POLYMERS FOR CLARIFICATION AND DEWATERING

(75) Inventors: Jane B. Wong Shing, Aurora; Chidambaram Maltesh, Naperville; John R. Hurlock, Hickory Hills, all of IL (US); Elise E. Maury, Leiden (NL)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/392,172

(22) Filed: Sep. 8, 1999

(51) Int. Cl.$^7$ .................................................. C02F 1/56
(52) U.S. Cl. .................... 210/708; 162/189; 210/727; 210/734; 210/928; 516/172
(58) Field of Search ..................... 162/189, 190; 210/708, 705, 725, 727, 728, 734, 733, 928; 516/170, 172

(56) References Cited

U.S. PATENT DOCUMENTS

| | | | | |
|---|---|---|---|---|
| 5,332,506 | * | 7/1994 | Marble et al. ................ | 210/705 |
| 5,429,749 | * | 7/1995 | Chung et al. ................ | 210/734 |
| 5,472,617 | * | 12/1995 | Barthold et al. ............. | 516/172 |
| 5,605,970 | | 2/1997 | Selvarajan .................. | 525/274 |
| 5,708,071 | * | 1/1998 | Takeda ....................... | 524/458 |
| 5,837,776 | | 11/1998 | Selvarajan et al. ........... | 525/244 |
| 5,938,937 | * | 8/1999 | Sparapany et al. ............ | 210/728 |
| 5,985,992 | | 11/1999 | Chen ......................... | 524/814 |
| 6,020,422 | * | 2/2000 | Conners et al. .............. | 524/716 |

FOREIGN PATENT DOCUMENTS 0 183 466 A2   6/1986   (EP) .

* cited by examiner

Primary Examiner—Peter A. Hruskoci
(74) Attorney, Agent, or Firm—Michael B. Martin; Thomas M. Breininger

(57) ABSTRACT

This invention is directed to a method of clarifying and dewatering industrial waste water using anionic and nonionic dispersion polymers.

19 Claims, No Drawings

ANIONIC AND NONIONIC DISPERSION POLYMERS FOR CLARIFICATION AND DEWATERING

TECHNICAL FIELD

This invention concerns a method of clarifying industrial waste water using a high molecular weight water-soluble anionic or nonionic dispersion polymer.

BACKGROUND OF THE INVENTION

Water-soluble polymeric flocculants are commonly used for clarifying suspensions of organic matter of a proteinaceous or cellulosic nature such as those found in sewage and industrial plant treatment effluents or in paper mills.

These suspended materials are hydrophilic in nature and often have specific gravities quite close to the aqueous liquors in which they are suspended, and differ in a marked way with more hydrophobic mineral suspensions in that they are frequently much more difficult to flocculate economically with chemical reagents prior to a physical dewatering step such as filtration, flotation, sedimentation or dewatering. These difficulties are particularly noticeable when higher proportions of suspended matter are present, commonly involving concentrations of 0.5 percent by weight and upwards where the suspensions take on a paste-like consistency and are commonly described as sludges.

It is well known that the clarification or dewatering of sewage and industrial sludges and similar organic suspensions may be aided by chemical reagents, added in order to induce a state of coagulation or flocculation which facilitates the process of solid/liquid or liquid/liquid separation from water. For this purpose, lime or salts of iron or aluminum have been utilized. More recently synthetic polyelectrolytes, particularly certain cationic and anionic copolymers of acrylamide, have been found to be of interest.

These types of polymers, which may be natural or synthetic, are broadly termed coagulants and flocculants. These polymers can be utilized in such diverse processes as emulsion breaking, sludge dewatering, raw and waste water clarification, drainage and retention aids in the manufacture of pulp and paper, flotation aids in mining processing and color removal.

In the water treatment field of solids/liquid separation, suspended solids are removed from water by a variety of processes, including sedimentation, straining, flotation, filtration, coagulation, flocculation, and emulsion breaking among others. Additionally, after suspended solids are removed from the water they must often be dewatered so that they may be further treated or properly disposed of. Liquids treated for solids removal often have as little as several parts per billion of suspended solids or dispersed oils, or may contain large amounts of suspended solids or oils. Solids being dewatered may contain anywhere from 0.25 weight percent solids, to 40 or 50 weight percent solids material. Solids/liquid or liquid/liquid separation processes are designed to remove solids from liquids, or liquids from liquids.

While strictly mechanical means have been used to effect solids/liquid separation, modem methods often rely on mechanical separation techniques which are augmented by synthetic and natural polymeric materials to accelerate the rate at which solids can be removed from water. These processes include the treatment of raw water with cationic coagulant polymers which settle suspended inorganic particulates and make the water usable for industrial or municipal purposes. Other examples of these processes include the removal of colored soluble species from paper mill effluent wastes, the use of organic flocculant polymers to flocculate industrial and municipal waste materials, sludge recovery and emulsion breaking.

Regarding the mechanism of separation processes, particles in nature have either a cationic or anionic charge. Accordingly, these particles often are removed by a water soluble coagulant or flocculant polymer having a charge opposite to that of the particles. This is referred to as a polyelectrolyte enhanced solids/liquid separation process, wherein a water soluble or dispersible ionically charged polymer is added to neutralize the charged particles or emulsion droplets to be separated. The dosage of these polymers is critical to the performance of the process. Too little ionically charged polymer, and the suspended particles will not be charge neutralized and will thus still repel each other. Too much polymer, and the polymer will be wasted, or worse, present a problem in and of itself.

Notwithstanding the variety of commercially available polymers which have been found to effect solids/liquid separation, there are various circumstances which tend to limit the usefulness of these reagents. While for certain waste waters economical treatments with these known reagents are feasible, more often very high and cost-ineffective dosages of reagents are required for successful treatment. Moreover, variations often occur in waste water from any one source. For example, variations in the supply of material to the waste water/sludge/paper furnish process water and/or in the oxidizing conditions that may be involved in the production of these waters lead to a variety of particle types which must be removed. Furthermore, it is not uncommon to encounter solids which are, for some reason, not amenable to flocculation by any of the known polymeric flocculating agents. It is therefore an object of the invention to provide to the art a superior method for clarifying and dewatering industrial waste water.

Commonly assigned U.S. Pat. No. 5,605,970 discloses a process for preparing certain high-molecular weight anionic polymer dispersions. Commonly assigned U.S. Pat. No. 5,837,776 discloses certain high molecular weight anionic flocculants and a process for their preparation. A process for the production of a water-soluble polymer dispersion in the presence of a dispersant, wherein the dispersant may be a poly(2-acrylamido-2-methyl propane sulfonic acid (AMPS)) or a copolymer having 30 or more mole percent of AMPS is disclosed in EP 0 183 466.

SUMMARY OF THE INVENTION

In its principal aspect, this invention is directed to a method of clarifying and dewatering industrial waste water comprising adding to the waste water an effective amount of a high molecular weight water-soluble anionic or nonionic dispersion polymer wherein the dispersion polymer has a bulk Brookfield viscosity of from about 10 to about 25,000 cps at 25° C. and comprises from about 5 to about 50 weight percent of a water soluble polymer prepared by polymerizing under free radical forming conditions in an aqueous solution of a water-soluble salt in the presence of a stabilizer:

i. 0–100 mole percent of at least one anionic monomer, and, ii. 100–0 mole percent of at least one non-ionic vinyl monomer;

wherein the stabilizer is an anionic water soluble polymer having an intrinsic viscosity in 1M NaNO$_3$ of from about 0.1–10 dl/g and comprises from about 0.1 to about 5 weight percent based on the total weight of the dispersion, and the water soluble salt is selected from the group consisting of ammonium, alkali metal and alkaline earth metal halides, sulfates, and phosphates and comprises from about 5 to about 40 weight percent based on the weight of the dispersion.

DETAILED DESCRIPTION OF THE INVENTION

"Monomer" means a polymerizable allylic, vinylic or acrylic compound.

"Anionic monomer" means a monomer as defined herein which possesses a net negative charge. Representative anionic monomers include acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water soluble alkali metal, alkaline earth metal, and ammonium salts thereof. The choice of anionic monomer is based upon several factors including the ability of the monomer to polymerize with the desired comonomer, the use of the produced polymer, and cost. A preferred anionic monomer is acrylic acid.

In certain instances, it may be possible to chemically modify a non-ionic monomer component contained in the dispersion polymer of the invention after polymerization to obtain an anionic functional group, for example, the modification of an incorporated acrylamide mer unit to the corresponding sulfonate or phosphonate.

"Nonionic monomer" means a monomer as defined herein which is electrically neutral. Representative nonionic monomers include acrylamide, methacrylamide, N-methylacrylamide, N-isopropylacrylamide, N-t-butyl acrylamide, N-methylolacrylamide, N,N-dimethyl(meth) acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly (ethylene glycol) monomethyl ether mono(meth)acryate, N-vinyl-2-pyrrolidone, glycerol mono((meth)acrylate), 2-hydroxyethyl(meth)acrylate, vinyl methylsulfone, vinyl acetate, and the like. Preferred nonionic monomers of include acrylamide, methacrylamide, N-isopropylacrylamide, N-t-butyl acrylamide, and N-methylolacrylamide. More preferred nonionic monomers include acrylamide and methacrylamide. Acrylamide is still more preferred.

RSV stands for Reduced Specific Viscosity. Reduced Specific Viscosity is an indication of polymer chain length and average molecular weight. Polymer chain length and average molecular weight are indicative of the extent of polymerization during production. The RSV is measured at a given polymer concentration and temperature and calculated as follows:

$$RSV = \frac{[(\eta/\eta_o) - 1]}{c}$$

$\eta$=viscosity of polymer solution $\eta_o$=viscosity of solvent at the same temperature c=concentration of polymer in solution.

In this patent application, the units of concentration "c" are (grams/100 ml or g/deciliter). Therefore, the units of RSV are dl/g. In this patent application, for measuring RSV, the solvent used is 1.0 Molar sodium nitrate solution. The polymer concentration in this solvent is 0.045 g/dl. The RSV is measured at 30° C. The viscosities $\eta$ and $\eta_o$ were measured using a Cannon Ubbelohde semimicro dilution viscometer, size 75. The viscometer is mounted in a perfectly vertical position in a constant temperature bath adjusted to 30±0.02° C. The error inherent in the calculation of RSV is about 2 dl/grams. When two polymers of the same composition have similar RSV's measured under identical conditions that is an indication that they have similar molecular weights.

IV stands for intrinsic viscosity, which is RSV when the limit of polymer concentration is zero.

"Inverse emulsion polymer" and "latex polymer" mean a self-inverting water in oil polymer emulsion comprising a polymer according to this invention in the aqueous phase, a hydrocarbon oil for the oil phase, a water-in-oil emulsifying agent and an inverting surfactant. Inverse emulsion polymers are hydrocarbon continuous with the water soluble polymers dispersed as micron sized particles within the hydrocarbon matrix. The inverse emulsion polymers are then "inverted" or activated for use by releasing the polymer from the particles using shear, dilution, and, generally, another surfactant.

Inverse emulsion polymers are prepared by dissolving the required monomers in the water phase, dissolving the emulsifying agent in the oil phase, emulsifying the water phase in the oil phase to prepare a water-in-oil emulsion, homogenizing the water-in-oil emulsion, polymerizing the monomers dissolved in the water phase of the water-in-oil emulsion to obtain the polymer and then adding the self-inverting surfactant to obtain the water-in-oil self-inverting water-in-oil emulsion.

"Solution polymer" means a polymer prepared by a process in which monomers are polymerized in a solvent in which the resulting polymer is soluble. In general, solution polymerization is used to prepare lower molecular weight polymers, as the solution tends to become too viscous as the polymer molecular weight increases.

The preparation of a solution polymer is generally accomplished by preparing an aqueous solution containing one or more water-soluble monomers and any polymerization additives such as chelants, pH buffers or chain transfer agents. This solution is charged to a reactor equipped with a mixer, a thermocouple, a nitrogen purging tube and a water condenser. The solution is mixed vigorously, heated to the desired temperature, and then one or more water-soluble free radical polymerization initiators are added. The solution is purged with nitrogen while maintaining temperature and mixing for several hours. Typically, the viscosity of the solution increases during this period. After the polymerization is complete, the reactor contents are cooled to ambient temperature and transferred to storage.

"Dispersion polymer" means a water-soluble polymer dispersed in an aqueous continuous phase containing one or more inorganic salts. In the process of dispersion polymerization, the monomer and the initiator are both soluble in the polymerization medium, but the medium is a poor solvent for the resulting polymer. Accordingly, the reaction mixture is homogeneous at the onset, and the polymerization is initiated in a homogeneous solution. Depending on the solvency of the medium for the resulting oligomers or macroradicals and macromolecules, phase separation occurs at an early stage. This leads to nucleation and the formation of primary particles called "precursors" and the precursors are colloidally stabilized by adsorption of stabilizers. The particles are believed to be swollen by the polymerization medium and/or the monomer, leading to the formation of spherical particles having a size in the region of ~0.1–10.0 microns.

"Anionic dispersion polymer" means a dispersion polymer as defined herein which possesses a net negative charge.

"Nonionic dispersion polymer" means a dispersion polymer as defined herein which is electrically neutral.

In any dispersion polymerization, the variables that are usually controlled are the concentrations of the stabilizer, the monomer and the initiator, solvency of the dispersion medium, and the reaction temperature. It has been found that these variables can have a significant effect on the particle size, the molecular weight of the final polymer particles, and the kinetics of the polymerization process.

Particles produced by dispersion polymerization in the absence of any stabilizer are not sufficiently stable and may coagulate after their formation. Addition of a small percentage of a suitable stabilizer to the polymerization mixture produces stable dispersion particles. Particle stabilization in dispersion polymerization is usually referred to as "steric stabilization". Good stabilizers for dispersion polymerization are polymer or oligomer compounds with low solubility in the polymerization medium and moderate affinity for the polymer particles.

As the stabilizer concentration is increased, the particle size decreases, which implies that the number of nuclei formed increases with increasing stabilizer concentration. The coagulation nucleation theory very well accounts for the observed dependence of the particle size on stabilizer concentration, since the greater the concentration of the stabilizer adsorbed the slower will be the coagulation step. This results in more precursors becoming mature particles, thus reducing the size of particles produced.

As the solvency of the dispersion medium increases, (a) the oligomers will grow to a larger MW before they become a precursor nuclei, (b) the anchoring of the stabilizer moiety will probably be reduced and (c) the particle size increases. As the initiator concentration is increased, it has been observed that the final particle size increases. As for the kinetics, it is reported that when the dispersion medium is a non-solvent for the polymer being formed, then the locus of polymerization is largely within the growing particles and the system follows the bulk polymerization kinetics, n (the kinetic chain length)=$R_p/R_t$, where $R_p$ is the propagation rate and $R_t$ is the termination rate. As the solvency of the dispersion medium for the growing polymer particle is increased, polymer growth proceeds in solution. The polymeric radicals that are formed in solution are then captured by growing particles. Consequently, the locus of the particle polymerization process changes and there is a concomitant change in the kinetics of polymerization.

The dispersion polymers of the instant invention contain from about 0.1 to about 5 weight percent based on the total weight of the dispersion of a stabilizer.

Stabilizers as used herein include anionically charged water soluble polymers having a molecular weight of from about 100,000 to about 5,000,000 and preferably from about 1,000,000 to about 3,000,000. The stabilizer polymer must be soluble or slightly soluble in the salt solution, and must be soluble in water. The stabilizer polymers generally have an intrinsic viscosity in 1M $NaNO_3$ of from about 0.1–10 dl/g, preferably from about 0.5–7.0 dl/g and more preferably from about 2.0–6.0 dl/g at 30° C.

Preferred stabilizers are polyacrylic acid, poly(meth) acrylic acid, poly(2-acrylamido-2-methyl-1-propanesulfonic acid) and and copolymers of 2-acrylamido-2-methyl-1-propanesulfonic acid and an anionic comonomer selected from acrylic acid and methacrylic acid.

The stabilizer polymers are prepared using conventional solution polymerization techniques, are prepared in water-in-oil emulsion form or are prepared in accordance with the dispersion polymerization techniques described herein. The choice of a particular stabilizer polymer will be based upon the particular polymer being produced, the particular salts contains in the salt solution, and the other reaction conditions to which the dispersion is subjected during the formation of the polymer.

Preferably from about 0.1 to about 5 percent by weight, more preferably from about 0.25 to about 1.5 percent and still more preferably, from about 0.4 to about 1.25 percent by weight of stabilizer, based on the weight of the total dispersion or finished product, is utilized.

Polymer dispersions prepared in the absence of the stabilizer component result in paste like slurries indicating that a stable dispersion did not form. The paste like products generally thickened within a relatively short period of time into a mass that could not be pumped or handled within the general applications in which polymers of this type are employed.

The remainder of the dispersion consists of an aqueous solution comprising from about 2 to about 40 weight percent based on the total weight of the dispersion of a water soluble salt selected from the group consisting of ammonium, alkali metal and alkaline earth metal halides, sulfates, and phosphates.

The salt is important in that the polymer produced in such aqueous media will be rendered insoluble on formation, and polymerization will accordingly produce particles of water soluble polymer when suitable agitation is provided. The selection of the particular salt to be utilized is dependent upon the particular polymer to be produced, and the stabilizer to be employed. The selection of salt, and the amount of salt present should be made such that the polymer being produced will be insoluble in the salt solution. Particularly useful salts include a mixture of ammonium sulfate and sodium sulfate in such quantity to saturate the aqueous solution. While sodium sulfate may be utilized alone, we have found that it alters the precipitation process during polymerization. Salts containing di- or trivalent anions are preferred because of their reduced solubility in water as compared to for example alkali, alkaline earth, or ammonium halide salts, although monovalent anion salts may be employed in certain circumstances. The use of salts containing di- or trivalent anions generally results in polymer dispersions having lower percentages of salt materials as compared to salts containing monovalent anions.

The particular salt to be utilized is determined by preparing a saturated solution of the salt or salts, and determining the solubility of the desired stabilizer and the desired polymer. Preferably from about 5 to about 30, more preferably from about 5 to about 25 and still more preferably from about 8 to about 20 weight percent based on the weight of the dispersion of the salt is utilized. When using higher quantities of monomer less salt will be required.

In addition to the above, other ingredients may be employed in making the polymer dispersions of the present invention. These additional ingredients may include chelating agents designed to remove metallic impurities from interfering with the activity of the free radical catalyst employed, chain transfer agents to regulate molecular weight, nucleating agents, and codispersant materials. Nucleating agents when utilized generally encompass a small amount of the same polymer to be produced. Thus if a polymer containing 70 mole percent acrylic acid (or its water soluble salts) and 30 percent acrylamide were to be produced, a nucleating agent or "seed" of the same or similar polymer composition may be utilized. Generally up to about 10 weight percent, preferably about 0.1 to about 5, more preferably from about 0.5 to about 4 and still more preferably from about 0.75 to about 2 weight percent of a nucleating agent is used based on the polymer contains in the dispersion is utilized.

Codispersant materials to be utilized include dispersants from the classes consisting of water soluble sugars, polyethylene glycols having a molecular weight of from about 2000 to about 50,000, and other polyhydric alcohol type materials. Amines and polyamines having from 2–12 carbon atoms are often times also useful as codispersant materials, but, must be used with caution because they may also act as chain transfer agents during polymerization. The function of a codispersant is to act as a colloidal stabilizer during the early stages of polymerization. The use of codispersant materials is optional, and not required to obtain the polymer dispersions of the invention. When utilized, the codispersant is present at a level of up to about 10, preferably from about 0.1–4 and more preferably from about 0.2–2 weight percent based on the dispersion.

The total amount of water soluble polymer prepared from the anionic and the nonionic water soluble monomers in the dispersion may vary from about 5 to about 50 percent by weight of the total weight of the dispersion, and preferably from about 10 to about 40 percent by weight of the dispersion. Most preferably the dispersion contains from about 15 to about 30 percent by weight of the polymer prepared from the nonionic and anionic water soluble monomers.

Polymerization reactions described herein are initiated by any means which results in generation of a suitable free-radical. Thermally derived radicals, in which the radical species results from thermal, homolytic dissociation of an azo, peroxide, hydroperoxide and perester compound are preferred. Especially preferred initiators are azo compounds including 2,2'-azobis(2-amidinopropane)dihydrochloride, 2,2'-azobis[2-(2-imidazolin-2-yl)propane] dihydrochloride, 2,2'-azobis(isobutyronite) (AIBN), 2,2'-azobis(2,4'-dimethylvaleronitrile) (AIVN), and the like.

The monomers may be mixed together with the water, salt and stabilizer prior to polymerization, or alternatively, one or both monomers may be added stepwise during polymerization in order to obtain proper incorporation of the monomers into the resultant dispersion polymer. Polymerizations of this invention may be run at temperatures ranging from −10° C. to as high as the boiling point of the monomers employed. Preferably, the dispersion polymerization is conducted at from −10° C. to about 80° C. More preferably, polymerization is conducted at from about 30° C. to about 45° C.

The dispersion polymers of this invention are prepared at a pH of about 3 to about 8. After polymerization the pH of the dispersion may be adjusted to any desired value as long as the polymer remains insoluble to maintain the dispersed nature. Preferably, polymerization is conducted under inert atmosphere with sufficient agitation to maintain the dispersion.

The dispersion polymers of the instant invention typically have bulk solution viscosities of less than about 25,000 cps at 25° C. (Brookfield), more preferably less than 5,000 cps and still more preferably less than about 2,000 cps. At these viscosities, the polymer dispersions are easily handled in conventional polymerization equipment.

The dispersion polymers of this invention typically have molecular weights ranging from about 50,000 up to the aqueous solubility limit of the polymer. Preferably, the dispersions have a molecular weight of from about 1,000,000 to about 50 million.

In a preferred aspect of this invention, the stabilizer has a concentration from about 0.25 to about 2 weight percent based on the weight of the total dispersion and an intrinsic viscosity in 1M $NaNO_3$ of from about 0.5–7.0 dl/g.

In another preferred aspect of this invention, the stabilizer is poly(acrylic acid); poly(2-acrylamido-2-methyl-1-propanesulfonic acid); an anionic water soluble copolymer formed by free radical polymerization of 2-acrylamido-2-methyl-1-propanesulfonic acid with acrylic acid, wherein the copolymer comprises from about 3 to about 60 weight percent 2-acrylamido-2-methyl-1-propanesulfonic acid and from about 97 to about 40 weight percent acrylic acid; or an anionic water soluble copolymer formed by free radical polymerization of 2-acrylamido-2-methyl-1-propanesulfonic acid with methacrylic acid, wherein the copolymer comprises from about 11 to about 95.5 weight percent 2-acrylamido-2-methyl-1-propanesulfonic acid and from about 89 to about 4.5 weight percent methacrylic acid.

In a more preferred aspect of this invention, the water-soluble polymer is poly (acrylic acid/acrylamide) having a weight ratio of 7:93 for acrylic acid to acrylamide and the stabilizer is poly (2-acrylamido-2-methyl-1'-propanesulfonic acid/acrylic acid) having a weight ratio of 13:87 2-acrylamido-2-methyl-1-propanesulfonic acid: acrylic acid.

In another more preferred aspect of this invention, the water-soluble polymer is poly (acrylic acid/acrylamide) having a weight ratio of 7:93 for acrylic acid to acrylamide and the stabilizer is poly (2-acrylamido-2-methyl-1-propanesulfonic acid/acrylic acid) having a weight ratio of 51:49 2-acrylamido-2-methyl-1-propanesulfonic acid: methacrylic acid.

In another more preferred aspect of this invention, the water-soluble polymer is poly (acrylic acid/acrylamide) having a weight ratio of 30:70 for acrylic acid to acrylamide and the stabilizer is poly (2-acrylamido-2-methyl-1-propanesulfonic acid/methacrylic acid) having a weight ratio of 84.7:15.3 2-acrylamido-2-methyl-1-propanesulfonic acid: methacrylic acid.

In a more preferred aspect of this invention, the water-soluble polymer is poly (acrylic acid/acrylamide) having a weight ratio of 30:70 for acrylic acid to acrylamide and the stabilizer is poly (2-acrylamido-2-methyl-1-propanesulfonic acid/methacrylic acid) having a weight ratio of 90.6:9.4 2-acrylamido-2-methyl-1-propanesulfonic acid: methacrylic acid.

In another more preferred aspect of this invention, from about 0.1 to about 50 ppm of the high molecular weight water-soluble anionic or nonionic dispersion polymer is added to the waste water.

In another more preferred aspect of this invention, from about 0.5 to about 10 ppm of the high molecular weight water-soluble anionic or nonionic dispersion polymer is added to the waste water.

PREPARATION OF AA/AMPS AND MAA/AMPS COPOLYMER STABILIZERS

Example 1

To a 1.5-liter resin reactor equipped with stirrer, temperature controller, and water cooled condenser is added 906.79 g of deionized water, 200 g of acrylic acid, 220.34 g of a 50% solution of sodium hydroxide (pH=7.0) and 0.20 g of EDTA. The resulting solution is sparged with 1000 cc/min. of nitrogen, heated to 45° C. and 1.00 g of a 12% solution of sodium bisulfite and 5.00 g of a 10% solution of 2,2'-azobis(N,N'2-amidinopropane) dihydrochloride (V-50, available from Wako Chemicals USA, Inc., Richmond, Va., USA) are added. Polymerization begins within 5 minutes and after 20 minutes, the solution became viscous and the temperature of the reaction rises to 80° C. The reaction is continued for a total of 16 hours at 78–82° C. The resulting polymer has a Brookfield viscosity of 60000 cps at 25° C. and contains 15% of a homopolymer of acrylic acid with an intrinsic viscosity of 2.08 dl/gm in 1.0 molar $NaNO_3$.

Example 2

To a 1.5-liter resin reactor equipped with stirrer, temperature controller and water cooled condenser is added 910.75 g of deionized water, 49.45 g of a 58% solution of the sodium salt of 2-acrylamido-2-methyl-1-propanesulfonic acid (AMPS), 171.32 g of acrylic acid, 187.17 g of a 50% solution of sodium hydroxide (pH=7.0) and 0.20 g of EDTA. The resulting solution is sparged with 1000 cc/min. of nitrogen, heated to 45° C. and 1.00 g of a 25% solution of sodium bisulfite and 5.00 g of a 10% solution of V-50 are added. Polymerization begins within 5 minutes and after 15 minutes, the solution becomes viscous and the temperature of the reaction rises to 80° C. The reaction is continued for a total of 16 hours at 78–82° C. The resulting polymer solution has a Brookfield viscosity of 15100 cps at 25° C. and contains 15% of a 87/13 w/w copolymer of acrylic acid/AMPS with an intrinsic viscosity of 1.95 dl/gm in 1.0 molar $NaNO_3$.

The properties of the AA, AMPS and AA/AMPS stabilizers prepared in Examples 1–8 are ummarized in Table 1. Stabilizers 3–7 are prepared as described in Example 2. Stabilizer 8 is prepared as described in U.S. Pat. No. 5,837,776.

TABLE 1

| AA and AA/AMPS Copolymer Stabilizers | | | | |
|---|---|---|---|---|
| Example | Stabilizer AA/AMPS wt/wt | Stabilizer AA/AMPS mol/mol | IV dl/gm | VISC cp. |
| 1 | 100/0 | 100/0 | 2.08 | 60000 |
| 2 | 87/13 | 95.0/5.0 | 1.95 | 15100 |
| 3 | 97/3 | 98.75/1.25 | 2.19 | 56000 |
| 4 | 93/7 | 97.5/2.5 | 2.44 | 69500 |
| 5 | 77/23 | 90.7/9.3 | 2.49 | 61000 |
| 6 | 60/40 | 80/20 | 2.35 | 12500 |
| 7 | 40/60 | 66/37 | 2.79 | 1000 |
| 8 | 0/100 | 0/100 | 3.73 | |

Example 9

To a 1.5-liter resin reactor equipped with stirrer, temperature controller and water cooled condenser is added 945.59 g of deionized water, 141.96 g of a 58% solution of the sodium salt of 2-acrylamido-2-methyl-1-propanesulfonic acid (AMPS), 126.18 g of 99% methacrylic acid, 114.9 g of a 50% solution of sodium hydroxide (pH=7.0) and 0.20 g of EDTA. The resulting solution is sparged with 1000 cc/min. of nitrogen, heated to 45° C. and 0.50 g of V-50 is added. Polymerization began within 15 minutes and after 60 minutes, the solution becomes viscous and the temperature of the reaction rises to 50° C. The reaction is continued for a total of 72 hours at 48–52° C. The resulting polymer solution has a Brookfield viscosity of 61300 cps at 25° C. and contains 15% of a 62.5/37.5 w/w (80/20 M/M) copolymer of methacrylic acid/AMPS with an intrinsic viscosity of 4.26 dl/gm in 1.0 molar $NaNO_3$. cl Example 10

To a 1.5-liter resin reactor equipped with stirrer, temperature controller and water cooled condenser is added 939.21 g of deionized water, 191.92 g of a 58% solution of the sodium salt of 2-acrylamido-2-methyl-1-propanesulfonic acid (AMPS), 99.5 g of 99% methacrylic acid, 92.0 g of a 50% solution of sodium hydroxide (pH=7.0) and 0.20 g of EDTA. The resulting solution is sparged with 1000 cc/min. of nitrogen, heated to 45° C. and 0.50 g of V-50 is added. Polymerization begins within 15 minutes and after 60 minutes, the solution becomes viscous and the temperature of the reaction rises to 50° C. The reaction is continued for 18 hours at 48–52° C. The reaction mixture is then heated to 80° C. and maintained at 78–82° C. for 24 hours. The resulting polymer solution has a Brookfield viscosity of 43200 cps at 25° C. and contains 15% of a 49/51 w/w (70/30 M/M) copolymer of methacrylic acid/AMPS with an intrinsic viscosity of 4.28 dl/gm in 1.0 molar $NaNO_3$.

The properties of the MAA/AMPS stabilizers prepared in Examples 9–19 are summarized in table 3. Stabilizers 11–19 are prepared as described in Examples 9 and 10.

TABLE 2

MAA/AMPS Copolymer Stabilizers.

| Example | Polymer MAA/AMPS wt/wt | Polymer MAA/AMPS mol/mol | IV dl/gm | VISC cp. |
|---|---|---|---|---|
| 9 | 62.5/37.5 | 80/20 | 4.26 | 61300 |
| 10 | 49/51 | 70/30 | 4.28 | 43200 |
| 11 | 79/21 | 90/10 | 3.07 | 24375 |
| 12 | 89/11 | 95/05 | 3.55 | 37000 |
| 13 | 38.4/61.6 | 60/40 | 3.59 | 32500 |
| 14 | 29.4/70.6 | 50/50 | 3.63 | 31750 |
| 15 | 29.4/70.6 | 50/50 | 3.10 | 15100 |
| 16 | 21.7/78.3 | 40/60 | 2.88 | 9420 |
| 17 | 15.3/84.7 | 30/70 | 2.54 | 6470 |
| 18 | 9.4/90.6 | 20/80 | 2.53 | 8150 |
| 19 | 4.5/95.5 | 10/90 | 2.38 | 41000 |

PREPARATION OF THE ANIONIC DISPERSION POLYMERS

Example 20

To a 1.5-liter resin reactor equipped with stirrer, temperature controller and water cooled condenser is added 442.44 g of deionized water, 126 g of sodium sulfate, 84 g of ammonium sulfate, 0.40 g of sodium formate, 40 g of a 15% solution of an 87/13 w/w copolymer of acrylic acid/Amps, 280.99 g of a 49.6% solution of acrylamide (139.36 g), 10.64 g of acrylic acid, 11.65 g of 50% aqueous sodium hydroxide, 0.40 g of sodium formate and 0.25 g of EDTA. The mixture is heated to 35° C. and 0.30 g of a 4% solution of 2,2' azobis(N,N'-dimethylene isobutryramidine) dihydrochloride (VA-044, available from Wako Pure Chemical Industries Ltd, Osaka, Japan) is added. The resulting solution is sparged with 1000 cc/min. of nitrogen. After 30 minutes, polymerization begins and the solution becomes viscous. After 2 hours, the mixture is a milky dispersion and 0.30 g of a 4% solution of VA-044 is added. After 4 hours, 0.30 g of a 4% solution of VA-044 is added. After 5 hours, 1.20 g of a 4% solution of VA-044 is added. After 8 hours, 2.90 g of a 4% solution of VA-044 is added. The reaction is continued for a total of 16 hours at 34–36° C. The resulting polymer dispersion has a Brookfield viscosity of 2950 cps. To the resulting dispersion polymer is added 6 g of sodium sulfate and 4 g of ammonium sulfate. The resulting polymer dispersion has a Brookfield viscosity of 1200 cps, a pH of 7.0, and contains 15% of a 93/7 copolymer of acrylamide/acrylic acid with a reduced specific viscosity of 23.1 dl/gm at 0.045% in 1.0 N $NaNO_3$.

Example 21

To a 1.5-liter resin reactor equipped with stirrer, temperature controller and water cooled condenser is added 443.42 g of deionized water, 126 g of sodium sulfate, 84 g of ammonium sulfate, 0.40 g of sodium formate, 40 g of a 15% solution of a 62.5/37.5 w/w copolymer of methacrylic acid/AMPS, 280.99 g of a 49.6% solution of acrylamide (139.36 g), 10.64 g of acrylic acid, 11.8 g of 50% aqueous sodium hydroxide and 0.25 g of EDTA. The mixture is heated to 35° C. and 0.30 g of a 1% solution of VA-044 is added. The resulting solution is sparged with 1000 cc/min. of nitrogen. After 30 minutes, polymerization begins and the solution becomes viscous. After 2 hours, the mixture is a milky dispersion and 0.30 g of a 1% solution of VA-044 is added. After 4 hours, 0.30 g of a 1% solution of VA-044 is added. After 5 hours, 1.2 g of a 1% solution of VA-044 is added. After 6 hours, 2.9 g of a 1% solution of VA-044 is added. After 7 hours, 5.0 g of a 1% solution of VA-044 is added. The reaction is continued for a total of 16 hours at 34–36° C. To the resulting dispersion polymer is added 6 g of sodium sulfate and 4 g of ammonium sulfate. The resulting polymer dispersion has a Brookfield viscosity of 825 cps, a pH of 7.0, and contains 15% of a 93/7 copolymer of acrylamide/acrylic acid with a reduced specific viscosity of 22.9 dl/gm at 0.045% in 1.0 N $NaNO_3$.

Example 22

To a 1.5-liter resin reactor equipped with stirrer, temperature controller and water cooled condenser is added 535.81 g of deionized water, 71.27 g of sodium sulfate, 92.78 g of ammonium sulfate, 0.80 g of sodium formate, 40 g of a 15% solution of a 29.4/70.6 w/w copolymer of methacrylic acid/AMPS, 210.81 g of a 49.6% solution of acrylamide (104.56 g), 45.44 g of acrylic acid, 1.50 g of 50% sodium hydroxide and 0.25 g of EDTA. The mixture is heated to 35° C. and 1.0 g of a 2% solution of VA-044 is added. The resulting solution is sparged with 1000 cc/min. of nitrogen. After 1.5 hours, the mixture is a milky dispersion. After 4 hours, 1.0 g of a 2% solution of VA-044 is added. After 7 hours, 3.0 g of a 2% solution of VA-044 is added. The reaction is continued for a total of 27 hours at 34–36° C. The resulting polymer dispersion has a Brookfield viscosity of 10000 cps, a pH of 3.62, and contained 15% of a 70/30 copolymer of acrylamide/acrylic acid with a reduced specific viscosity of 18.78 dl/gm at 0.045% in 1.0 N $NaNO_3$.

The properties of representative anionic polymer dispersions are listed in Table 3. In Table 3, Polymer I is prepared as described in Example 20, Polymers II, III and IV are prepared as described in Example 21 and Polymers V, VI, VII VIII, IX, X and XI are prepared as described in Example 22 using the appropriate stabilizer.

TABLE 3

Anionic Dispersion Polymers with AA/AMPS and MAA/AMPS Stabilizers.

| | Polymer Description | | | | Stabilizer | |
|---|---|---|---|---|---|---|
| | AcAm/AA (Wt. %) | RSV, dl/g | Formate Level, ppm | Actives, % | Chemistry (Wt. %) | IV, dl/g |
| I | 93/7 | 23.1 | 400 | 15 | AA/AMPS 87/13 | 1.95 |

TABLE 3-continued

Anionic Dispersion Polymers with AA/AMPS and MAA/AMPS Stabilizers.

| | Polymer Description | | | | |
|---|---|---|---|---|---|
| | | Formate | | Stabilizer | |
| | AcAm/AA (Wt. %) | RSV, dl/g | Level, ppm | Actives, % | Chemistry (Wt. %) | IV, dl/g |
| II | 93/7 | 22.9 | 400 | 15 | MAA/AMPS 62.5/37.5 | 4.26 |
| III | 93/7 | 23.4 | 400 | 15 | MAA/AMPS 49/51 | 4.28 |
| IV | 93/7 | 21.9 | 530 | 20 | MAA/AMPS 49/51 | 4.28 |
| V | 70/30 | 30.1 | 800 | 15 | MAA/AMPS 15.3/84.7 | 4.25 |
| VI | 70/30 | 28.0 | 2800 | 25 | MAA/AMPS 15.3/84.7 | 2.5 |
| VII | 70/30 | 33.0 | 3100 | 25 | MAA/AMPS 15.3/84.7 | 4.2 |
| VIII | 70/30 | 20.0 | 4000 | 30 | MAA/AMPS 9.4/90.6 | 2.5 |
| IX | 70/30 | 23 | 3600 | 25 | MAA/AMPS 9.4/90.6 | 2.5 |
| X | 70/30 | 28.6 | 3300 | 25 | MAA/AMPS 15.3/84.7 | 2.5 |
| XI | 70/30 | 36 | 1200 | 15 | AMPS | 3.7 |

PREPARATION ON NONIONIC DISPERSION POLYMERS

Example 23

To a 1.5-liter resin reactor equipped with a stirrer, temperature controller and water cooled condenser is added 403.75 g of deionized water, 131.25 g of sodium sulfate, 87.5 g of ammonium sulfate, 64 g of a 15% solution of an 80/20 mole/mole acrylic acid/AMPS copolymer (IV=1.94 dl/gm), 481.72 g of a 48.6% solution of acrylamide (234.1 g), 0.60 g of sodium formate and 0.33 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2.75 hours, the mixture is a milky dough to which is added 0.30 g of a 2% solution of VA-044. After 3.75 hours, 0.30 g of a 2% solution of VA-044 is added. After 4.75 hours, the mixture is a milky dispersion and 1.2 g of a 2% solution of VA-044 is added. After 6.5 hours, 2.90 g of a 2% solution of VA-044 is added. The reaction is continued for a total of 24 hours at 34–36° C. At the end of the reaction the dispersion (4484-039) has a Brookfield viscosity of 2770 cps. To this dispersion is added 15 g of sodium sulfate and 10 g of ammonium sulfate. The resulting dispersion has a Brookfield viscosity of 487.5 cps and contains 20% of a homopolymer of acrylamide with an intrinsic viscosity of 15.26 dl/gm in 1.0 molar $NaNO_3$.

The properties of representative nonionic dispersion polymers are shown in Table 4. The polymers shown in Table 4 are prepared according to the method of Example 23.

TABLE 4

Nonionic Poly (acrylic acid) Dispersion Polymers.

| Polymer | Actives % | Stabilizer Composition Mole/Mole | Visc. Cps. | IV |
|---|---|---|---|---|
| XII | 20 | 19/81 AMPS/Acrylic acid | 500 | 12.2 |
| XIII | 15 | 100% poly AMPS | 535 | 13.1 |
| XIV | 15 | 80/20 AMPS/Acrylic acid | 287.5 | 12.9 |
| XV | 15 | 34/66 AMPS/Acrylic acid | 160 | 14.2 |
| XVI | 15 | 19/81 AMPS/Acrylic acid | 140 | 13.5 |
| XVII | 15 | 9.3/90.7 Amps/Acrylic acid | 270 | 13.8 |
| XVIII | 15 | 100% poly Acrylic acid | 563 | 15.5 |
| XIX | 15 | 100% poly Methacrylic acid | 820* | 13.4 |
| XX | 15 | 90/10 Acrylic acid/acrylamide | 555* | 13.6 |
| XXI | 15 | 19/81 Amps/Acrylic acid | 1645 | 13.4 |
| XXII | 15 | 100% poly Acrylic acid | 130 | 13.8 |

*These dispersions eventually gelled.

The properties of other representative polymer treatments are shown in Table 5.

TABLE 5

Representative Polymer Treatments.

| Polymer | Chemistry AcAm/AA (wt. %) | RSV, dl/g | Form | Source |
|---|---|---|---|---|
| XXIII | 70/30 | 30 | Latex | Nalco ® 625 from Nalco Chemical Company |
| XXIV | 93/7 | 30 | Latex | Nalco ® 623 from Nalco Chemical Company |

Representative Coagulants are shown in Table 6.

TABLE 6

Representative Coagulants.

| Chemistry | Commercial Source |
|---|---|
| Red | Solution polymer of epichlorohydrin - dimethylamine | Nalco ® 7655 from Nalco Chemical Company |
| Blue | Aluminum sulfate, hydrate (or alum) | Aldrich Chemical Company |

Deinking of Paper Mill Process Water

Recycled paper is increasingly used as a pulp source. One of the major pulping steps involves removal of the ink from any source of printed recycled paper. Large volumes of water are required for the ink removal process and its clean-up is accomplished using a solids/liquid separation unit operation. Dissolved air flotation (DAF) is commonly used.

Dissolved air flotation is a solids-removal process where fine air bubbles become attached to the suspended particles, thus reducing the density of individual particles and causing them to float to the surface. The separated solids then form a floating layer that is a mixture of solids and air bubbles. The buoyant force exerted by the entrapped air also acts to compact the solids into a smaller volume before the floating layer is skimmed off.

Air is usually introduced to the inflowing ink-laden water via a pressurized mixing chamber. When the influent enters the non-pressurized flotation unit, the supersaturated solution releases the air in the form of very fine bubbles which become attached to the suspended particles. To get maximum results from a flotation unit, a clarification aid must be added along with the air. Flotation methods can achieve high levels of suspended solids removal, up to 98%.

Recycle mills are most frequently located in the metropolitan areas where an emphasis on closing the water cycle of the mill is great. Consequently, effective clean-up of the deinking wash waters becomes important because reuse of the water generated e.g. from a DAF, can lead to reduced sheet quality such as brightness. Also, if these waters are used for other purposes, minimizing the amounts of BOD/COD and suspended solids is desirable.

Clarification chemicals are typically utilized in conjunction with mechanical clarifiers for the removal of solids from the process water stream. The clarification chemicals coagulate and/or flocculate the suspended solids into larger particles, which can then be removed from the process stream by gravitational settling or flotation.

Clarification generally refers to the removal of nonsettleable material by coagulation, flocculation and sedimentation. Coagulation is the process of destabilization by charge neutralization. Once neutralized, particles no longer repel each other and can be brought together. Coagulation is necessary for removal of colloidal sized suspended matter. Flocculation is the process of bringing together the destabilized, "coagulated" particles to form a larger agglomeration or floc.

Depending upon the characteristics of the individual waters, differing chemical types and programs may be utilized. It is conventional to utilize a dual polymer program for clarification of deinking process waters by dissolved air flotation. Typically, this comprises an inorganic coagulant or a low molecular weight cationic coagulant followed by a high molecular weight flocculant.

The use of inorganic coagulants for clarifying waste water is disclosed in U.S. Pat. No. 4,655,934 and references cited therein. Preferred inorganic coagulants include aluminum sulfate, aluminum chloride, ferric sulfate and ferric chloride. Preferably, from about 200 to about 500 ppm of the inorganic coagulant is added to the waste water.

"Low molecular weight cationic coagulant" means any water-soluble polymer which carries or is capable of carrying a cationic charge when dissolved in water. Such polymers include condensation polymers as well as polymers derived from vinyl monomers. Vinyl polymers having water solubility and cationic characteristics, as described above, include modified polyacrylamides, modification being made, for example, by the typical Mannich reaction products or the quaternized Mannich reaction products, or other vinylic polymers which use as a vinyl monomer those monomers containing functional groups which have cationic character. Representative vinyl monomers include allyl amine, dimethylaminoethylmethacrylate, dimethylaminoethylmethacrylate quatermized with dimethyl sulfate, diallylcyclohexylamine hydrochloride, diallyl dimethyl ammonium chloride, dimethyl aminoethyl acrylate and/or its acid salts, methacrylamidopropyl trimethyl ammonium chloride, 1-acrylamido-4-methyl piperazine (quaternized with MeCl, MeBr, or dimethyl Sulfate), diethylaminoethyl acrylate and/or its acid salts, diethylaminoethyl methacrylate and/or its acid salts, dimethylaminoethyl acrylamide and/or its acid salts, dimethylaminoethyl methacrylamide and/or its acid salts, diethyl aminoethyl acrylamide and/or its acid salts, diethyl aminoethyl methacrylamide and/or its acid salts, and the like, and mixtures thereof. The cationic coagulant preferably has a molecular weight of from about 2,000 to greater than 1,000,000. See U.S. Pat. No. 4,655,934, incorporated herein by reference.

Cationic coagulants comprising polydiallyl dimethyl ammonium chloride and one or more anionic monomers are disclosed in U.S. Pat. Nos. 4,715,962, 5,013,456 and 5,207,924, incorporated herein by reference.

Cationic coagulants comprising dimethyl ammonium chloride and vinyltrialkoxysilane monomer units are disclosed in U.S. Pat. No. 5,589,075, incorporated herein by reference.

Preferred low molecular weight cationic coagulants are epichlorohydrin-dimethylamine and polydiallyldimethylammonium chloride. See U.S. Pat. No. 4,655,934, incorporated herein by reference. Preferably from about 1 to about 50 ppm of the water-soluble cationic polymer is added to the waste water.

Notwithstanding the dual treatment regimens discussed above, an advantage of the anionic and nonionic dispersion polymers of this invention is that the method may employ the dispersion polymer as the sole treatment agent. Although other treatment agents may be added as adjuncts, they are not required for activity. Another advantage of this invention is that the use of these dispersion polymers affords removal of particulate materials without the unwanted addition of oils and surfactants contained in conventional latex polymers. Moreover, these polymers require no inverter system and can be introduced to the paper process stream using simple feeding equipment.

The anionic and nonionic dispersion polymers described herein are effective for the clarification of paper mill waste water. The activity of the dispersion polymers is measured using a jar test as follows.

Samples of the DAF influent are stirred at 200 rpm (fast mix) for 3 minutes. A coagulant (alum) is added at the beginning of fast mix and the anionic or nonionic dispersion polymer is added during the last 40 seconds of the fast mix. The addition of the dispersion polymer is followed by a slow mix of 25 rpm for 2 minutes. The samples are allowed to settle for 5 minutes and an aliquot of the upper liquid layer is removed. The turbidity of the supernatant, measured in Formazin Turbidity Units (FTU's), is then determined with a HACH DR2000 at 450 nm. The lower the turbidity, the more efficient the flocculant. The turbidity values (in FTU) that were determined are converted to (Percent Improvement) values using the formula:

$$\text{Percent Improvement} = 100 \times (\text{Turbidity}_u - \text{Turbidity}_t) / \text{Turbidity}_u$$

where $\text{Turbidity}_u$ is the turbidity reading result for the blank for which no polymer or microparticle, and wherein $\text{Turbidity}_t$ is the turbidity reading result of the test using polymer.

The polymer dose recited herein (ppm) is parts actual polymer per million parts of liquid being treated.

TABLE 7

Percentage Improvement in Clarification Performance using Anionic Flocculant Alone.

| Flocculant Dosage, ppm | Polymer XXIV | Polymer I |
|---|---|---|
| 0.55 | 10.4 | 14.5 |
| 1.10 | 18.6 | 23.7 |
| 2.20 | 22.0 | 27.9 |
| 3.30 | 25.3 | 35.8 |

TABLE 8

Percentage Improvement in Clarification Performance of Anionic Flocculant in the Presence of Cationic Polymeric Coagulant Red at 1.7 ppm.

| Flocculant Dosage, ppm | Polymer XXIV | Polymer I |
|---|---|---|
| 0.55 | 59.7 | 65.4 |
| 1.10 | 57.0 | 64.7 |
| 2.20 | 56.9 | 68.7 |

TABLE 9

Percentage Improvement in Clarification Performance of Anionic Flocculant in the Presence of Coagulant (Flocculant dosed @ 1.1 ppm).

| Coagulant Red Dosage, ppm | Polymer XXIV | Polymer I |
|---|---|---|
| 0.55 | 40.5 | 44.9 |
| 1.10 | 53.5 | 61.5 |
| 1.70 | 57.0 | 64.7 |
| 3.40 | 61.0 | 77.1 |
| 5.50 | 65.2 | 73.9 |

TABLE 10

Percentage Improvement in Clarification Performance of Anionic Flocculant in the Presence of Coagulant Blue (Flocculant dosed at 11 ppm).

| Coagulant Red Dosage, ppm | Polymer XXIV | Polymer I |
|---|---|---|
| 50 | 66.1 | 69.3 |
| 150 | 70.4 | 72.9 |

TABLE 11

Clarification Performance of Anionic Flocculant in the Presence of Dual Cationic Coagulants (Coagulant Blue at 150 ppm, Coagulant Red at 1.7 ppm).

| Flocculant Dosage, ppm | Polymer XXIV | Polymer I |
|---|---|---|
| 0.27 | 72.5 | 75.1 |
| 1.10 | 79.1 | 81.6 |

The above data shows that the anionic dispersion has better performance than the latex flocculant at equivalent dosages. Even in the presence of coagulants, the anionic dispersion has better performance than the latex flocculant at equivalent dosages. The latex flocculant is less effective as the concentration is increased but this effect is not observed for the dispersion product. The data in Table 9 clearly shows that for a fixed flocculant dose, the anionic dispersion performs significantly better than the latex product as the coagulant dose is increased. The difference between the latex and dispersion products is evident, though to a lesser extent, even when an inorganic coagulant (alum) is present.

Sludge Dewatering

Flocculants have long been used in the treatment of waste water, however efforts are constantly being made at improving the flocculants used in sludge removal and waste water applications in general. Flocculant manufacturers are constantly searching to maximize the drainage or removal of water from the sludge while using lower amounts of polymer.

The dewatering performance of the latex and dispersion polymers is compared on a paper mill sludge from a midwestern paper mill. The primary sludge from the mill had 3.1 % solids and is further diluted by half to facilitate experimentation. The desired amount of polymer is added to 200 mls of the sludge in a 500 ml graduated cylinder. Mixing is accomplished by turning the cylinder end-over-end 5 times and then the conditioned sludge is poured through a belt-press filter medium. The amount of water drained in 10 seconds is taken as a measure of the polymer performance, with a higher drainage indicative of better dewatering capabilities. The results obtained are shown in Table 12.

TABLE 12

Dewatering Performance of Anionic Flocculants.

| | Free Drainage (mls) in 10 seconds | | | |
|---|---|---|---|---|
| Polymer dose, ppm | Polymer XXIII | Polymer X | Polymer XXIII + Coagulant Red (11 ppm) | Polymer X + Coagulant Red (11 ppm) |
| 6.2 | | 100 | | 105 |
| 7.2 | 104 | | 109 | |
| 12.5 | | 105 | | 106 |
| 14.5 | 103 | | 100 | |

Accordingly, in another aspect, this invention is directed to a method of dewatering sludge comprising adding to the sludge an effective amount of a high molecular weight water-soluble anionic or nonionic dispersion polymer wherein the dispersion polymer has a bulk Brookfield viscosity of from about 10 to about 25,000 cps at 25° C. and comprises from about 5 to about 50 weight percent of a water soluble polymer prepared by polymerizing under free radical forming conditions in an aqueous solution of a water-soluble salt in the presence of a stabilizer:

i. 0–100 mole percent of at least one anionic monomer, and, ii. 100–0 mole percent of at least one non-ionic vinyl monomer;

wherein the stabilizer is an anionic water soluble polymer having an intrinsic viscosity in 1 M $NaNO_3$ of from about 0.1–10 dl/g and comprises from about 0.1 to about 5 weight percent based on the total weight of the dispersion, and the water soluble salt is selected from the group consisting of ammonium, alkali metal and alkaline earth metal halides, sulfates, and phosphates and comprises from about 5 to about 40 weight percent based on the weight of the dispersion.

Clarification of Oily Waste Water

In industry, oily waste waters are produced in various processes located in the steel and aluminum industries, chemical processing industry (CPI), automotive industry, laundry industry and refinery industry. In these industries, highly refined oils, lubricants and greases contact water for various purposes according to the particular industry. This results in a highly dispersed or severe oil-in-water emulsion in the waste water streams.

For example, in the steel and aluminum industries, waste water from steel and aluminum mills using hot rolling mills contain lubricating and hydraulic pressure hydrocarbons. Waste water from cold rolling mills contains oils that lubricates the sheets and reduces rust. Specifically, in cold rolling mills, oil-in-water emulsions are sprayed on the metal during rolling to act as coolants. Also, metalworking plants generate waste water streams containing lubricating and cutting oils, lapping and deburring compounds, grinding and other specialty fluids. These oils are generally highly refined hydrocarbons.

Refinery waste oil comes from two different sources: (1) Skimmings from the water clarification equipment, i.e., DAF's, API separators, and consisting mainly of crude oil; and, (2) Leakage from processes collected via traps and drains throughout the plant. This oil is usually sent to a waste water treatment plant.

One type of waste oil is formed during the process of removing dispersed oil from waste water in waste water treatment plants. The oil (called "float" or "skimmings") is concentrated in clarification vessels such as dissolved air floatation units (DAFs), induced gas floatation units (IGFs), corrugated plate interceptors (CPIs), and holding tanks. The oil floats to the top of these units, is removed by mechanical means and then stored. This waste oil may then be disposed of by incineration, sent to oil reclamation sites, or treated on-site. These waste oils have a minimum of 50% to 95% oil and contain emulsified water and solids which are stabilized by chemicals used to remove the oil from the waste water.

Waste waters from cotton and wool manufacturing plants contain oils and greases from the scouring, desizing and finishing operations. Finishing oils used in cotton and wool manufacturing to reduce friction and snagging of fibers on spinning machines end up in the waste water. Processes in other industries also generate oily waste water such as: paints, surface coatings, and adhesives; soaps and detergents; dyes and inks; and the leather industry. In each of the industries described above, the oils used in process ultimately contaminate waste water streams as highly dispersed or oil-in-water emulsions.

The emulsified oil in the waste water is typically present in the range of several hundred to tens of thousands of ppm. It is critical to remove this oil from a waste stream before discharge from an environmental standpoint. The United States Environmental Protection Agency has placed strict restrictions on total oil and grease (TOG) limits for water that is to be discharged into public drinking water supplies or into open bodies of water. The removal of this oil is very critical to meeting the established discharge limits for total dissolved solids (TSS), carbon oxygen demand (COD), biological oxygen demand (BOD) and total organic carbon (TOC) into local sewers and rivers. Not only has the EPA established strict limits on the oil and grease discharge, these industries are affected by local city ordinances as well.

An emulsion is an intimate mixture of two liquid phases, such as oil and water, in which the liquids are mutually insoluble and where either phase may be dispersed in the other. An oily waste emulsion, in which oil is dispersed in the water phase, may contain any of a variety of oils in a wide range of concentrations. These oils are defined as substances that can be extracted from water by hexane, carbon tetrachloride, chloroform, or fluorocarbons: In addition to oils, typical contaminants of these emulsions may be solids, silt, metal particles, emulsifiers, cleaners, soaps, solvents, and other residues. The types of oils found in these emulsions will depend on the industry. They may be lubricants, cutting fluids, heavy hydrocarbons such as tars, grease, crude oils, and diesel oils, and also light hydrocarbons including gasoline, kerosene, and jet fuel. Their concentration in the waste water may vary from only a few parts per million to as much as 5 to 10% by volume.

A stable oil-in-water emulsion is a colloidal system of electrically charged oil droplets surrounded by an ionic environment. Emulsion stability is maintained by a combination of physical and chemical mechanisms.

Emulsions may be broken by chemical, electrolytic, or physical methods. The breaking of an emulsion is also called resolution, since the aim is to separate the original mixture into its parts. Chemicals are commonly used for the treatment of oily waste waters, and are also used to enhance mechanical treatment. In breaking emulsions, the stabilizing factors must be neutralized to allow the emulsified droplets to coalesce. The accumulated electric charges on the emulsified droplet are neutralized to allow the emulsified droplets to coalesce. The accumulated electric charges on the emulsified droplet are neutralized by introducing a charge opposite to that of the droplet. Chemical emulsion breakers provide this opposite charge, and are thus usually ionic in nature.

The treatment of oily waste water in normally divided into two steps, i.e., coagulation, which is the destruction of the emulsifying properties of the surface active agent or neutralization of the charged oil droplet, and flocculation, which is the agglomeration of the neutralized droplets into large, separable globules. The term oily waste water refers to an oil-in-water emulsion which may contain oil, dispersed solids, and water.

Historically, dry polymers, solution polymers, and inverse emulsion latexes have been used to treat the waste water. Each material has its own advantages and disadvantages.

Water-in-oil emulsions of water-soluble vinyl addition polymers, referred to herein as latex polymers, are used quite frequently, though they have several disadvantages. The first disadvantage is that the latex polymer must be inverted prior to use, which complicates the process of feeding the polymer into the system. Numerous problems associated with this feeding method have caused many users to avoid latex polymers. Additionally, the latexes generally have a narrow treating range, which can result in overtreatment at higher dosages. Furthermore, latex polymers add even more oil to the stream to be treated because latex polymers typically include 20–30% by weight of a hydrocarbon continuous phase. Of course, adding more oil and surfactants to the system is undesirable when treating waste water streams.

Although solution polymers require no prior make up, active polymer content and molecular weight characteristics of these polymers are inherently limited. These coagulants are often used to break oil-in-water emulsions, but they are unable to flocculate the dispersed oil, thus requiring an adjunct chemical (a flocculant) to complete the process.

The anionic and nonionic dispersion polymers of this invention, as tested using the methodology described herein are effective for demulsifying oily waste water.

Accordingly, in another aspect, this invention is directed to a method of removing emulsified oil from industrial waste water comprising adding to the waste water an effective amount of a high molecular weight water-soluble anionic or nonionic dispersion polymer wherein the dispersion polymer has a bulk Brookfield viscosity of from about 10 to about 25,000 cps at 25° C. and comprises from about 5 to about 50 weight percent of a water soluble polymer prepared by polymerizing under free radical forming conditions in an aqueous solution of a water-soluble salt in the presence of a stabilizer:

i. 0–100 mole percent of at least one anionic monomer, and, ii. 100–0 mole percent of at least one non-ionic vinyl monomer;

wherein the stabilizer is an anionic water soluble polymer having an intrinsic viscosity in 1M $NaNO_3$ of from about 0.1–10 dl/g and comprises from about 0.1 to about 5 weight percent based on the total weight of the dispersion, and the water soluble salt is selected from the group consisting of ammonium, alkali metal and alkaline earth metal halides, sulfates, and phosphates and comprises from about 5 to about 40 weight percent based on the weight of the dispersion.

In a preferred aspect of the foregoing, the industrial waste water is selected from the group consisting of refinery and CPI industrial waste water, steel and aluminum industrial waste water, mat and food processing waste water, and oilfield waste water.

Clarification of Food Processing Waste

Every day the food processing industry produces many tons of food processing waste. Such food processing waste contaminates the water stream flowing through the food processing system. For example, poultry farm waste water effluents are enriched with fat, oil, blood and other solids from the poultry process. These by-products, such as fat, blood, and tissue, are typically present in the waste water in a range of several hundred to tens of thousands of ppm.

For economic as well as regulatory reasons, the food processing community faces never-ending concerns regarding the disposal and recycling of food processing waste water. The removal of such by-products is critical from an environmental standpoint. In fact, the United States Environmental Protection Agency has placed tight restrictions on total oil and solids content in water that is to be discharged into public drinking water supplies or into open bodies of water.

The removal of such solids is also critical to the established discharge limits for total dissolved solids (TDS), chemical oxygen demand (COD), biological oxygen demand (BOD) and total organic carbon (TOC) into local sewers and rivers. In addition to the EPA's severe discharge limits, food processing industries must also be concerned with local city ordinances.

As an alternative to discharging treated water into a water stream or the like, recycling of the waste back into the processing system provides a cost efficient system. However, in order to recycle such waste water, the solids content and so forth must be effectively removed in order to provide pure water back into the system. Accordingly, the same concerns that are present with respect to the removal of such solids for EPA standards exist for recycling purposes as well.

One of the most effective methods of removing fat, blood, tissue and other solids in waste waters is through the use of chemical aids. Historically, dry polymers and inverse emulsion latexes have been used to treat food processing water. Each material has its own advantages and disadvantages. While dry polymers have the benefit of being extremely concentrated, thereby reducing shipping costs, the equipment to dissolve the polymers is expensive and is not available to all end-users on site. Dry polymers also have a large extent of cross-linking; thus, insoluble, gel materials are present.

Latex polymers also suffer from problems but are used quite frequently. Latex polymer preparations include 30–35% solids dispersed in oil. The latex polymer must be also inverted prior to use. Numerous problems associated with this feeding method have caused many customers to avoid latex polymers. In addition, the latexes generally have a very narrow treating range, often resulting in overtreatment at higher dosages.

While these chemical treatments have provided a means for removing food, blood, oil and other solids from the waste water, disadvantages exist with the use of such chemical treatments. For example, the above polymers have been traditionally synthesized in an oil solvent, thereby producing an environmentally unfriendly treatment program as well as presenting a potential fire hazard. In addition, chemical treatments incorporating the above polymers contain surfactants. Still further, these prior chemical treatments have a high toxicity thereby preventing the use of such treated waters for recycling purposes or for public drinking water supplies.

The anionic and nonionic dispersion polymers described herein are effective for clarifying food processing waste. The activity of the dispersion polymers is measured using a Britt Jar test as described above.

The superiority of the anionic dispersion polymers over conventional latex polymer treatments is illustrated by the following examples.

To determine the increased effectiveness of the anionic dispersion polymer at improving the clarity of an oily waste water, jar tests are performed at a food disposal treatment facility. The European facility treated waste from restaurants (fatty waste) and industry (oily waste). The oil waste stream is currently treated with inorganic coagulant Blue and a latex polymer similar to polymerXXIII. For the testing, 400 ml of o/w (oil/water) snatch samples are taken. All snatch samples are equally treated with a dual coagulant program prior to the addition of the polymer (flocculant). The appropriate amount of polymer (flocculant) was added to the sample at a pH of 7.3. The solution was mixed 5 seconds vigorously, then slowly for 30 seconds.

The clarity of the supernatant was determined by measuring the turbidity of the filtrate with a Hach® DR-2000 spectrophotometer. The lower the turbidity reading, the better the clarity and thus the polymers' performance.

Table 13 compares the turbidity of clarified waters after treatment with polymers XI and XXIII. The dosages of the products in Table 13 are on an equal polymer basis. Normally one would expect an equal performance on an actives basis since the polymers are of the same chemical composition and colloidal charge, but in this case, increased effectiveness and efficiency are evident with Polymer XI of this invention, above that obtained with commercially available Polymer XXIII. Superior water clarity are obtained with Polymer XI compared to Polymer XXIII, thus a significantly lower treatment dosage can be utilized.

TABLE 13

| Polymer dose, ppm | Polymer XXIII | Polymer XI |
|---|---|---|
| Blank | 156 | 156 |
| 0.75 | — | 65 |
| 1.5 | 95 | 50 |
| 2.25 | 67 | 46 |
| 3 | 49 | 36 |
| 4.5 | 63 | — |

The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims:

What is claimed is:

1. A method of clarifying industrial waste water comprising adding to the waste water from about 0.1 to about 50 ppm of a high molecular weight water-soluble anionic or nonionic dispersion polymer wherein the dispersion polymer has a bulk Brookfield viscosity of from about 10 to about 25,000 cps at 25° C. and comprises from about 5 to about 50 weight percent of a water soluble polymer prepared by polymerizing under free radical forming conditions at a pH of from about 3 to about 8 in an aqueous solution of a water-soluble salt in the presence of a stabilizer:

i. 0 to about 30 mole percent of acrylic acid or methacrylic acid or the alkali metal, alkaline earth metal or ammonium salts thereof, and, ii. 100 to about 70 mole percent of acrylamide;

wherein the stabilizer is an anionic water-soluble copolymer of acrylic acid or methacrylic acid and 2-acrylamido-2-methyl-1-propanesulfonic acid having an intrinsic viscosity in 1M NaNO$_3$ of from about 0.1–10 dl/g and comprises from about 0.1 to about 5 weight percent based on the total weight of the dispersion, wherein the copolymer comprises from about 3 to about 60 weight percent 2-acrylamido-2-methyl-1-propanesulfonic acid and from about 97 to about 40 weight percent acrylic acid; or from about 11 to about 95.5 weight percent 2-acrylamido-2-methyl-1-propanesulfonic acid and from about 89 to about 4.5 weight percent methacrylic acid, and the water soluble salt is selected from the group consisting of ammonium, alkali metal and alkaline earth metal halides, sulfates, and phosphates and comprises from about 5 to about 40 weight percent based on the weight of the dispersion, and clarifying said industrial waste water.

2. The method of claim 1 wherein the stabilizer has a concentration from about 0.25 to about 2 weight percent based on the weight of the total dispersion and an intrinsic viscosity in 1M NaNO$_3$ of from about 0.5–7.0 dl/g.

3. The method of claim 2 wherein the water-soluble polymer is poly(acrylic acid/acrylamide) comprising from about 7 to about 30 weight percent acrylic acid and from about 93 to about 70 weight percent acrylamide.

4. The method of claim 3 wherein the water-soluble polymer is poly(acrylic acid/acrylamide) having a weight ratio of 7:93 for acrylic acid to acrylamide and the stabilizer is poly(2-acrylamido-2-methyl-1-propanesulfonic acid/acrylic acid) having a weight ratio of 13:87 2-acrylamido-2-methyl-1-propanesulfonic acid:acrylic acid.

5. The method of claim 3 wherein the water-soluble polymer is poly(acrylic acid/acrylamide) having a weight ratio of 7:93 for acrylic acid to acrylamide and the stabilizer is poly(2-acrylamido-2-methyl-1-propanesulfonic acid/methacrylic acid) having a weight ratio of 37.5:62.5 2-acrylamido-2-methyl-1-propanesulfonic acid:methacrylic acid.

6. The method of claim 3 wherein the water-soluble polymer is poly(acrylic acid/acrylamide) having a weight ratio of 7:93 for acrylic acid to acrylamide and the stabilizer is poly(2-acrylamido-2-methyl-1-propanesulfonic acid/acrylic acid) having a weight ratio of 51:49 2-acrylamido-2-methyl-1-propanesulfonic acid:methacrylic acid.

7. The method of claim 3 wherein the water-soluble polymer is poly(acrylic acid/acrylamide) having a weight ratio of 30:70 for acrylic acid to acrylamide and the stabilizer is poly(2-acrylamido-2-methyl-1-propanesulfonic acid/methacrylic acid) having a weight ratio of 84.7:15.3 2-acrylamido-2-methyl-1-propanesulfonic acid:methacrylic acid.

8. The method of claim 3 wherein the water-soluble polymer is poly(acrylic acid/acrylamide) having a weight ratio of 30:70 for acrylic acid to acrylamide and the stabilizer is poly(2-acrylamido-2-methyl-1-propanesulfonic acid/methacrylic acid) having a weight ratio of 90.6:9.4 2-acrylamido-2-methyl-1-propanesulfonic acid:methacrylic acid.

9. The method of claim 1 wherein from about 0.5 to about 10 ppm of the high molecular weight water-soluble anionic or nonionic dispersion polymer is added to the waste water.

10. The method of claim 1 wherein the industrial water is paper mill process water.

11. The method of claim 10 further comprising adding a coagulant to the waste water.

12. The method of claim 11 wherein the coagulant is a water-soluble cationic polymer.

13. The method of claim 12 wherein from about 1 to about 50 ppm of the water-soluble cationic polymer is added to the waste water.

14. The method of claim 12 wherein the water-soluble cationic polymer is epichlorohydrin-dimethylamine or polydiallyldimethylammonium chloride.

15. The method of claim 11 wherein the coagulant is an inorganic coagulant selected from aluminum sulfate, aluminum chloride, ferric sulfate and ferric chloride.

16. The method of claim 15 wherein from about 200 to about 500 ppm of the inorganic coagulant is added to the waste water.

17. A method of removing emulsified oil from industrial waste water comprising adding to the waste water from about 0.1 to about 50 ppm of a high molecular weight water-soluble anionic or nonionic dispersion polymer wherein the dispersion polymer has a bulk Brookfield viscosity of from about 10 to about 25,000 cps at 25° C. and comprises from about 5 to about 50 weight percent of a water soluble polymer prepared by polymerizing under free radical forming conditions at a pH of from about 3 to about 8 in an aqueous solution of a water-soluble salt in the presence of a stabilizer:

i. 0 to about 30 mole percent of acrylic acid or methacrylic acid or the alkali metal, alkaline earth metal or ammonium salts thereof, and, ii. 100 to about 70 mole percent of acrylamide;

wherein the stabilizer is an anionic water-soluble copolymer of acrylic acid or methacrylic acid and 2-acrylamido-2-methyl-1-propanesulfonic acid having an intrinsic viscosity in 1M NaNO$_3$ of from about 0.1–10 dl/g and comprises from about 0.1 to about 5 weight percent based on the total weight of the dispersion, wherein the copolymer comprises from about 3 to about 60 weight percent 2-acrylamido-2-methyl-1-propanesulfonic acid and from about 97 to about 40 weight percent acrylic acid; or from about 11 to about 95.5 weight percent 2-acrylamido-2-methyl-1-propanesulfonic acid and from about 89 to about 4.5 weight percent methacrylic acid, and the water soluble salt is selected from the group consisting of ammonium, alkali metal and alkaline earth metal halides, sulfates, and phosphates and comprises from about 5 to about 40 weight percent based on the weight of the dispersion, and removing said emulsified oil from said industrial waste water.

18. The method of claim 17 wherein the industrial waste water is selected from the group consisting of refinery and CPI industrial waste water, steel and aluminum industrial waste water, food processing waste water, and oilfield waste water.

19. A method of dewatering sludge comprising adding to the sludge from about 0.1 to about 50 ppm of a high molecular weight water-soluble anionic or nonionic dispersion polymer wherein the dispersion polymer has a bulk Brookfield viscosity of from about 10 to about 25,000 cps at 25° C. and comprises from about 5 to about 50 weight percent of a water soluble polymer prepared by polymerizing under free radical forming conditions at a pH of from about 3 to about 8 in an aqueous solution of a water-soluble salt in the presence of a stabilizer:

i. 0 to about 30 mole percent of acrylic acid or methacrylic acid or the alkali metal, alkaline earth metal or ammonium salts thereof, and, ii. 100 to about 70 mole percent of acrylamide;

wherein the stabilizer is an anionic water-soluble copolymer of acrylic acid or methacrylic acid and 2-acrylamido-2-methyl-1-propanesulfonic acid having an intrinsic viscosity in 1M NaNO$_3$ of from about 0.1–10 dl/g and comprises from about 0.1 to about 5 weight percent based on the total weight of the dispersion, wherein the copolymer comprises from about 3 to about 60 weight percent 2-acrylamido-2-methyl-1-propanesulfonic acid and from about 97 to about 40 weight percent acrylic acid; or from about 11 to about 95.5 weight percent 2-acrylamido-2-methyl-1-propanesulfonic acid and from about 89 to about 4.5 weight percent methaciylic acid, and the water soluble salt is selected from the group consisting of ammonium, alkali metal and alkaline earth metal halides, sulfates, and phosphates and comprises from about 5 to about 40 weight percent based on the weight of the dispersion, and dewatering said sludge.

* * * * *